United States Patent [19]

Miyata et al.

[11] Patent Number: 5,055,993
[45] Date of Patent: Oct. 8, 1991

[54] INVERTOR APPARATUS

[75] Inventors: Osamu Miyata, Yokohama; Katsunori Kawano, Tokyo; Youji Oki, Fuchu, all of Japan

[73] Assignee: Stanley Electric Company, Ltd., Japan

[21] Appl. No.: 447,638

[22] Filed: Dec. 8, 1989

[30] Foreign Application Priority Data

Jun. 29, 1989 [JP] Japan .................................. 1-165429

[51] Int. Cl.$^5$ ............................................ H02M 7/521
[52] U.S. Cl. ...................................... 363/98; 363/132; 315/219
[58] Field of Search ................... 363/16, 17, 24, 25, 363/26, 41, 98, 132, 97; 315/219, 223

[56] References Cited

U.S. PATENT DOCUMENTS

| 4,488,214 | 12/1984 | Chambers | 363/96 X |
| 4,670,832 | 6/1987 | Park | 363/17 X |
| 4,672,528 | 6/1987 | Park et al. | 363/98 |
| 4,700,112 | 10/1987 | Chang | 315/223 X |
| 4,794,506 | 12/1988 | Hino et al. | 363/17 X |
| 4,825,028 | 4/1989 | Smith | 363/132 X |

FOREIGN PATENT DOCUMENTS 2170663 8/1986 United Kingdom ............. 363/16 X

Primary Examiner—Steven L. Stephan
Assistant Examiner—Emanuel Todd Voeltz
Attorney, Agent, or Firm—Dykema Gossett

[57] ABSTRACT

An inverter apparatus for converting a direct current which flows through the primary side of an output transformer to an alternating current which is outputted from the secondary side of the transformer. Switching elements are used to interrupt the flow of the direct current through the primary of the output transformer and frequency control means is provided for driving the switching elements at the resonant frequency of the resonant circuit formed by the secondary of the output transformer and the load. A circuit for altering the pulse width of the output signal is also provided for controlling the power delivered to the load.

10 Claims, 6 Drawing Sheets

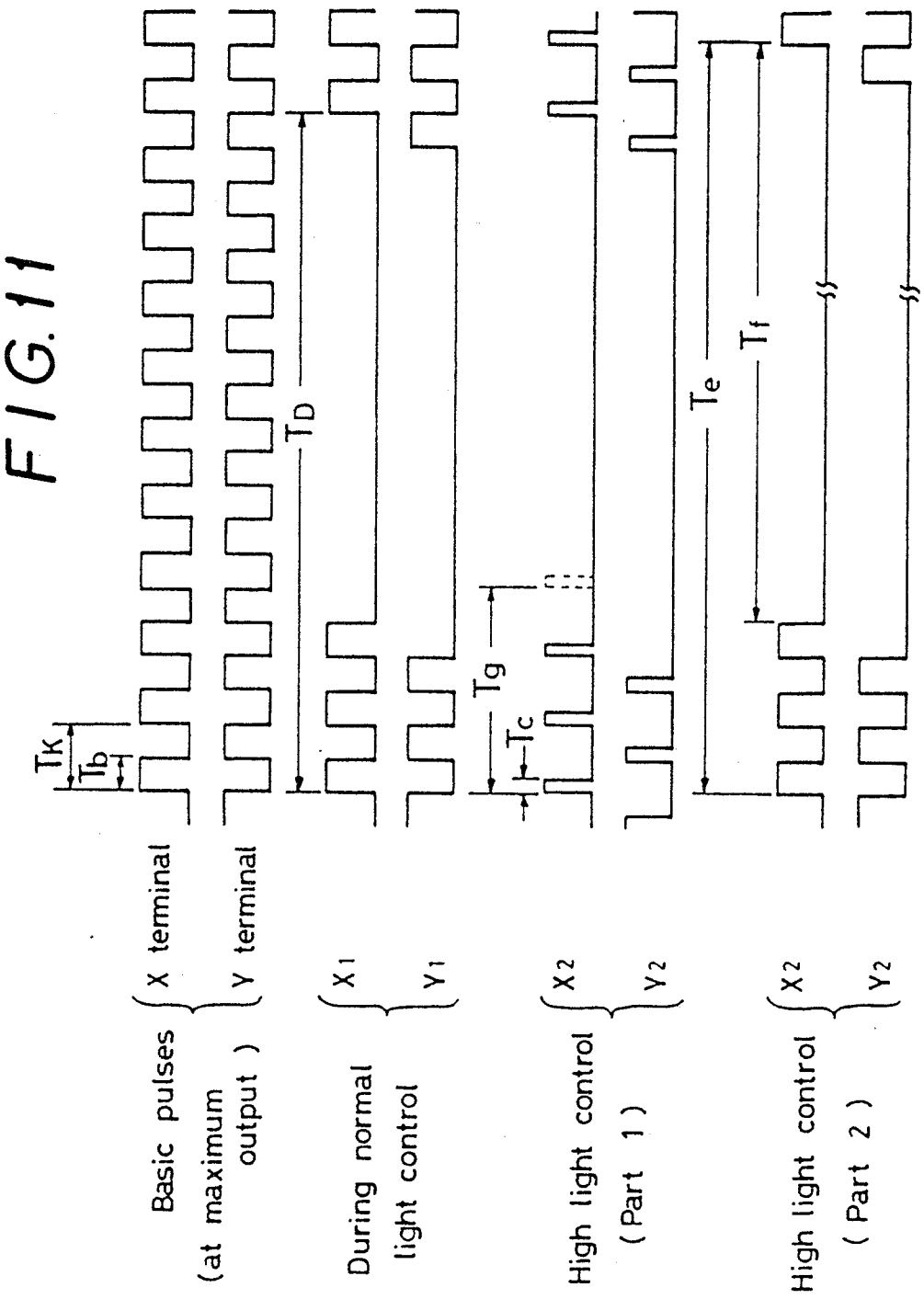

INVERTOR APPARATUS

BACKGROUND OF THE INVENTION

1. Field of the Invention

The present invention relates to an inverter apparatus for converting direct current (DC) to alternating current (AC) and outputting the same.

2. Description of the Prior Art

FIG. 12 shows the circuit diagram of a conventional inverter apparatus of this kind. In FIG. 12, $Q_1$ and $Q_2$ are switching elements driven by input signals from terminals A and B, respectively, comprising for instance transistors while $Q_3$ and $Q_4$ comprising switching elements connected to a primary coil N of an output transformer T, consisting of MOSFET, etc. The primary coil N of the output transformer T is provided with a center tap to which a DC power supply $V_{cc}$ is connected. $C_1$ is a capacitor connected to the secondary coil S of the output transformer T. A load 1, e.g. CFL is connected through this capacitor $C_1$. $R_1$ and $R_2$ are resistances.

The circuit of the foregoing configuration comprises an externally excited type inverter circuit; terminals A and B receive rectangular wave control signals from an external circuit consisting of a CPU or light control circuit, etc., continuously, which said control signals for instance comprising those of a frequency of several tens kHz with a phase shift of 180°. With these control signals, switching elements $Q_3$ and $Q_4$ as connected to the primary coil N of the output transformer T also turn ON and OFF repeatedly, thus generating AC in the secondary coil S of the output transformer T. This AC is supplied to a load 1. At that time, a tank circuit is composed of the output transformer T and the capacitor $C_1$. The resonant frequency of the tank circuit is matched with the frequency of control signals sent from said external circuit so that the output becomes maximum, thereby providing the load 1 with stabilized power. FIG. 13 shows the voltage waveforms at both terminals of the load 1.

However, with such a conventional inverter apparatus as described above, there is a drawback that the frequency of control signals entered from an external device cannot be matched exactly with the resonant frequency of the tank circuit comprising the output transformer and the capacitor because of the fluctuation in the inductance of the output transformer. This inability to match the resonant frequency of the tank circuit leads to lower operating efficiency. In addition, where rectangular-wave control signals enter from the external device, the voltage applied to the load becomes the differential of the rectangular waves, applying high voltages temporarily to the load. Consequently, no optimum control is applicable to the load.

SUMMARY OF THE INVENTION

The present invention has been accomplished to solve these problems. An object of the present invention is to provide such an inverter apparatus as the operating efficiency is high while allowing optimum control for the load.

The inverter apparatus of the present invention has been configured as follows.

(a) In such an inverter apparatus as DC inverter connected in the primary side of an output transformer is converted to AC by driving switching elements and outputted from the secondary side of said transformer, the apparatus is provided with such a frequency control means that the frequency of oscillation signals for driving said switching elements is matched with the resonant frequency of a resonant circuit formed by the output transformer.

(b) In the inverter apparatus (a) above, the frequency of the frequency control means is made manually adjustable.

(c) In the inverter apparatus of (a) above, the frequency of the frequency control means is made automatically adjustable so that the output voltage of the output transformer becomes maximum.

(d) In the inverter apparatus of (a) above, the frequency of the frequency control means is made automatically adjustable so that the input DC current becomes maximum.

(e) In the inverter apparatus of (a) above, the frequency control means comprising a PWM signal generator which generates PWM signals based on the output from a counter which counts up and down by a switch.

(f) In the inverter apparatus of (e) above, the frequency control means comprises the numbers of counters and PWM signal generators.

(g) In any inverter apparatus of (a) through (f) above, there is a coil having an inductance larger than the inductance in the primary side of the output transformer, connected between the primary side of said transformer and the DC power supply.

In the inverter apparatus of the present invention, there is a means provided for matching the frequency of oscillation signals supplied from an external device and the resonant frequency. Therefore, operating frequency becomes high while allowing to control the load.

BRIEF DESCRIPTION OF THE DRAWINGS

FIG. 11 shows output waveform of each part in FIG. 10;

DETAILED DESCRIPTION OF PREFERRED EMBODIMENTS

Figure 1:
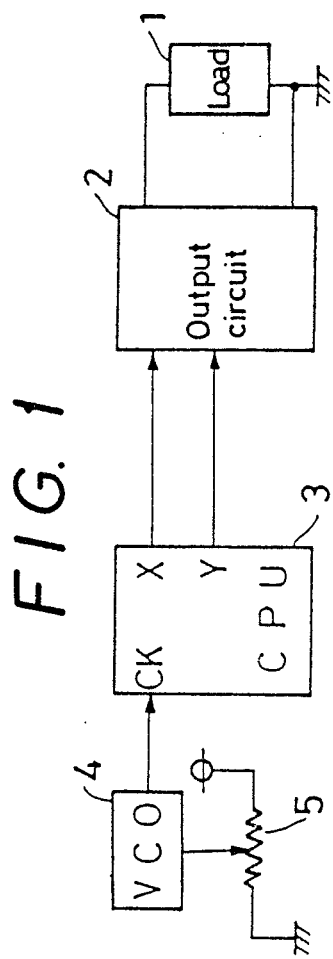
FIG. 1 is a block diagram showing the first embodiment of the present invention.

FIG. 1 is a block diagram showing the first embodiment of the present invention. Referring to FIG. 1, numerals 1 and 2 indicate a load and an output circuit (voltage step-up circuit) incorporating an output transformer and switching elements, respectively, in which DC entered in the primary side of the output transformer is converted to AC by driving the switching elements while outputting AC from the secondary side of said transformer to the load 1. Numeral 3 shows a CPU (central processing unit) which outputs driving pulses for driving the switching elements, while numerals 4 and 5 indicating a VCO (voltage controlled oscillator) for outputting clock signals (CK) to this CPU3 and a variable resistance for changing the output frequency of the VCO4, respectively. These devices 3, 4 and 5 constitute a frequency control means for matching the frequency of oscillation signals (driving pulses) for driving the switching elements in said output circuit 2 and the resonant frequency of a LC resonant circuit comprising the output transformer and a capacitor.

Figure 2:
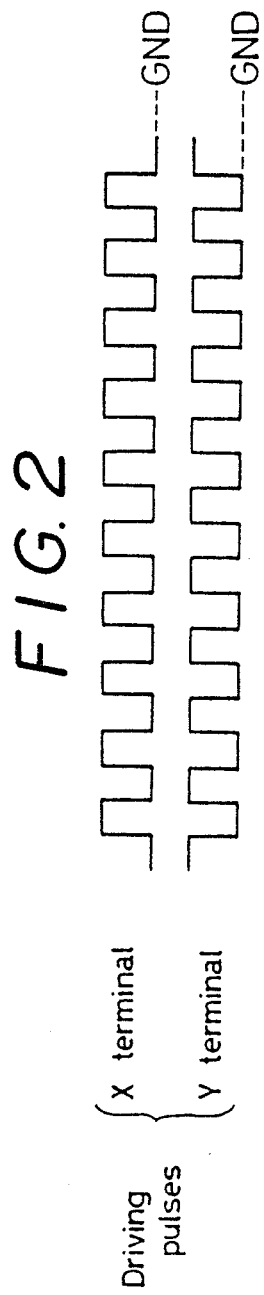
FIG. 2 shows waveforms of driving pulses entered in the output circuit of FIG. 1.
Figure 12:
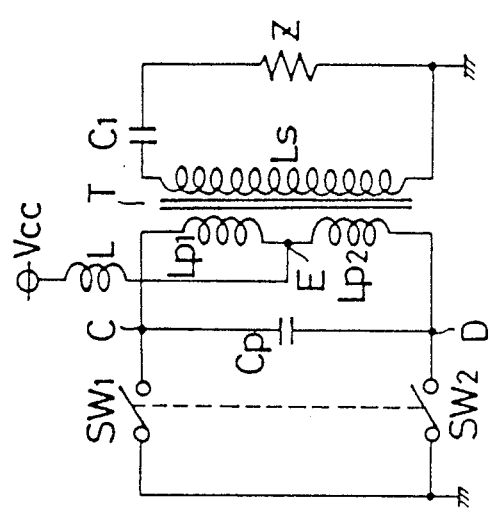
FIG. 12 is a circuit diagram of a conventional inverter apparatus.
Figure 13:
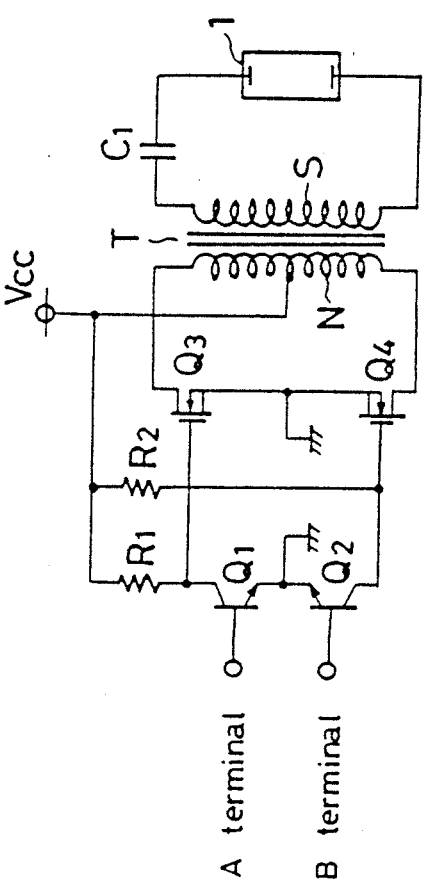
FIG. 13 is a voltage waveforms applied to the load of FIG. 12.

Said output circuit 2 is configured in the same manner as the circuit of FIG. 12; CPU3 supplies terminals X and Y with continued rectangular-wave driving pulses of a frequency of for example several tens of kHz with a phase shift of 180° as shown in FIG. 2. Said switching elements are driven by these driving pulses for converting DC entered in the primary side of the output transformer into which AC is outputted from the secondary side of said transformer to the load 1. At that time, a variable resistance 5 is manually adjusted while measuring the output voltage from the output circuit 2 for obtaining a maximum output voltage.

The frequency of driving pulses outputted from the CPU 3 to the output circuit 2 by means of the variable resistance 5 is changed as described above for matching with the frequency of said resonant circuit. Thus, the load 1 is controlled most adequately in high efficiency even with a fluctuating inductance in the output transformer.

Figure 3:
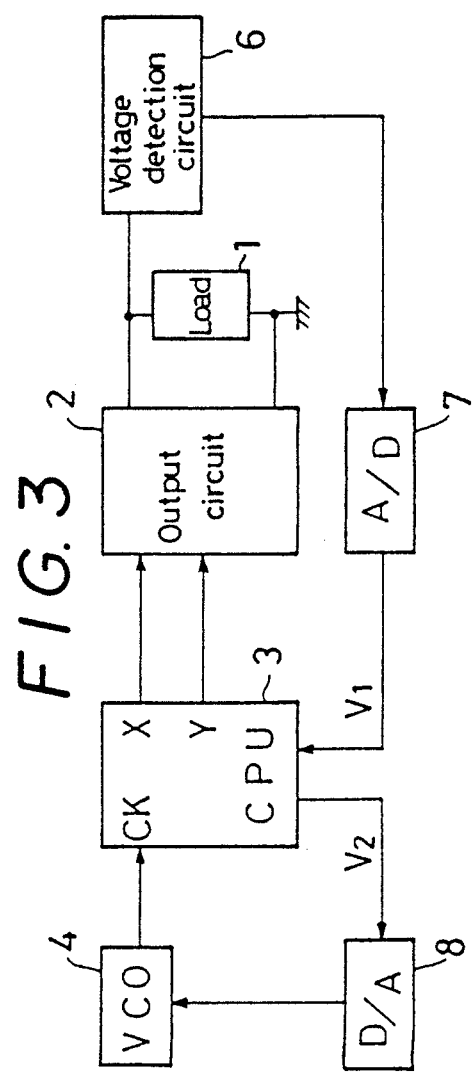
FIG. 3 is a block diagram showing the second embodiment of the present invention.

FIG. 3 is a block diagram showing the second embodiment of the present invention. With the embodiment of FIG. 1, matching was performed manually. However, if the impedance may alter due to time deterioration of the elements or the change of ambient conditions, the frequency, although once matched, may deviate. Therefore, the frequency of this embodiment is made automatically adjustable. More explicitly, the output voltage of the output transformer is detected continuously by a voltage detection circuit 6 while adjusting the frequency automatically to make the output voltage maximum.

Detection signals, outputted from said voltage detection circuit 6, enter in a A/D converter (along digital converter) 7 in which the signals are converted to digitalized signals $V_{INCPU}$ and outputted to the CPU3. The CPU3 stores the voltage level $V_1$ of these signals V in CPU in an internal memory. When the power supply is turned ON for the next time, the CPU3 controls the VCO4 to oscillate the signals in a frequency increased by one step (one step corresponds to several hundred Hz after converting the frequency, for example) from the frequency of signals $V_{OUTCPU}$ entered into the VCO4 via a D/A converter (digital/analong converter) 8, into said CPU3 as clock signals. Then, the CPU3 receives signals $V_{INCPU}$ again from the voltage detection circuit 6 via the A/D converter 7. At that time, the voltage level $V_1$ of the previous signals is compared to the voltage level of the present signals and, if $V_1 < V_2$, the data of $V_1$ is deleted from the internal memory while newly storing the data of $V_2$. These operations are repeated for comparing the present voltage level with that in the previous step and, only when the present voltage level is lower than or equal to the previous voltage level, the signals of the previous voltage level are allowed to enter in the VCO4 while fixing output signals $V_{OUTCPU}$ from the CPU3.

Figure 4:
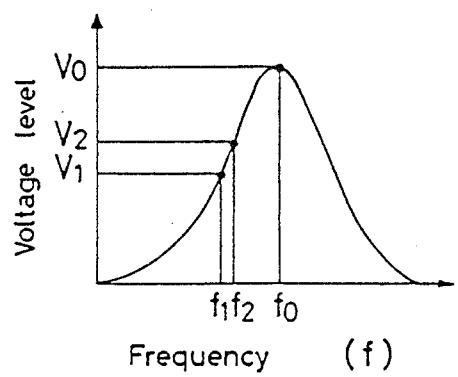
FIG. 4 is a descriptive view showing the operation of the circuit shown in FIG. 3.

Thus, complete matching as described above is assured by detecting resonant frequency $f_o$ between driving pulses outputted from the CPU3 and the resonant circuit (tank circuit) in the output circuit 2 and entering the signals $V_{OUTCPU}$ of a voltage level $V_o$ at that time, as sent from the CPU3, into the VCO4. FIG. 4 shows the relationship between the level (V) of said detected voltage and the clock frequency (f) of the CPU3.

A series of operations for detecting said frequency $f_o$ is activated every time the CPU3 is reset, that is the power supply is built up. When a current to be supplied to the load 1 is decreased, such driving pulses as oscillation is stopped intermediately are entered from the CPU3 to the output circuit 2, provided the load 1 is a discharge tube, e.g. CFL, during the period of controlling light. At that time, if the matching is automatically adjusted, it is greatly deviated. For preventing such a trouble, the signals $V_{OUTCPU}$ from the CPU3 is fixed always during the period of controlling light. However, the resonant frequency $f_o$ gradually alters due to time deterioration of the elements, etc. at a maximum output, as described above. Therefore, every predetermined time intervals, e.g. scores of minutes— several hours, outputted signal $V_{OUTCPU}$ is compared. If there is no change, the first routine operation as described above is activated after a certain time interval. However, if there is a change, the data of a new signal $V_{OUTCPU}$ is written in the memory and fixed therein and, after completion of this second routine operation, the first routine operation described above is activated.

Figure 5:
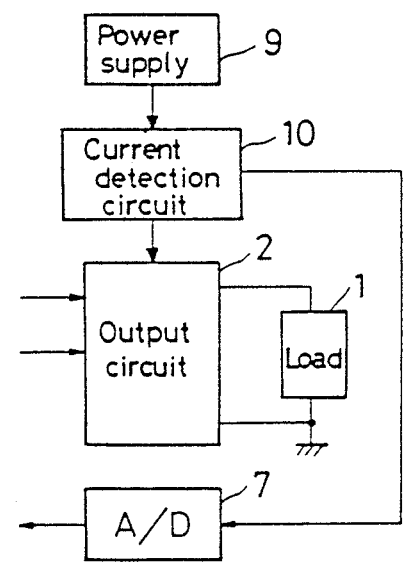
FIG. 5 is a block diagram showing the third embodiment of the present invention.

FIG. 5 is a block diagram showing the third embodiment of the present invention. This embodiment is intended also to automate frequency adjustment in the same manner as the foregoing embodiment of FIG. 3. With the third embodiment, the frequency is automatically adjusted so that an input DC current flowing into the output circuit 2 from the DC power supply 9 becomes maximum. In FIG. 5, numeral 10 is a current detection circuit for detecting the foregoing input DC current; its detected signals enter in a CPU, although not illustrated herein, via a A/D converter 7. Then, this CPU activates the same operation as the embodiment of FIG. 3 while maintaining complete matching all the time.

Figure 6:
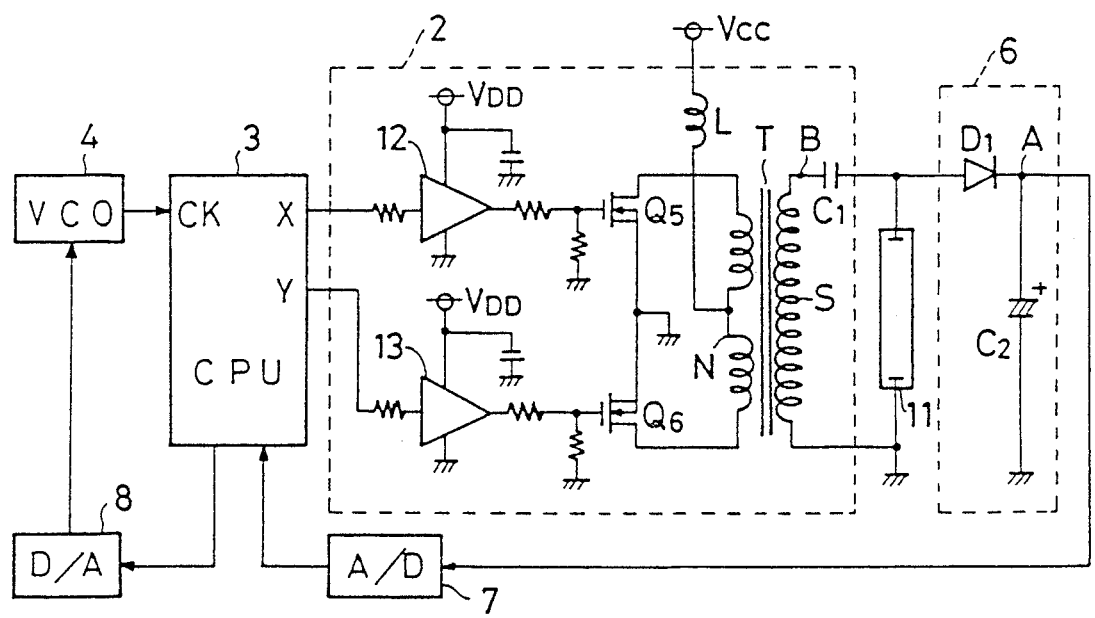
FIG. 6 is a circuit configuration view of the fourth embodiment of the present invention.

FIG. 6 is a circuit diagram which shows the 4th embodiment of the present invention. According to this embodiment, the load comprises a lighting apparatus for lighting up a discharge lamp 11 composed of a CFL, etc. Basic principles are the same as those of the circuit shown in FIG. 3. However, coil N has inductor L, between the center tap of the primary of coil N of said transformer T and a DC power supply ($V_{cc}$). The inductance of coil L is significantly larger than the inductance of the primary of coil N of transformer T. In addition, a voltage detection circuit 6 comprises a rectifying diode $D_1$ and a smoothing capacitor $C_2$.

Figure 7:
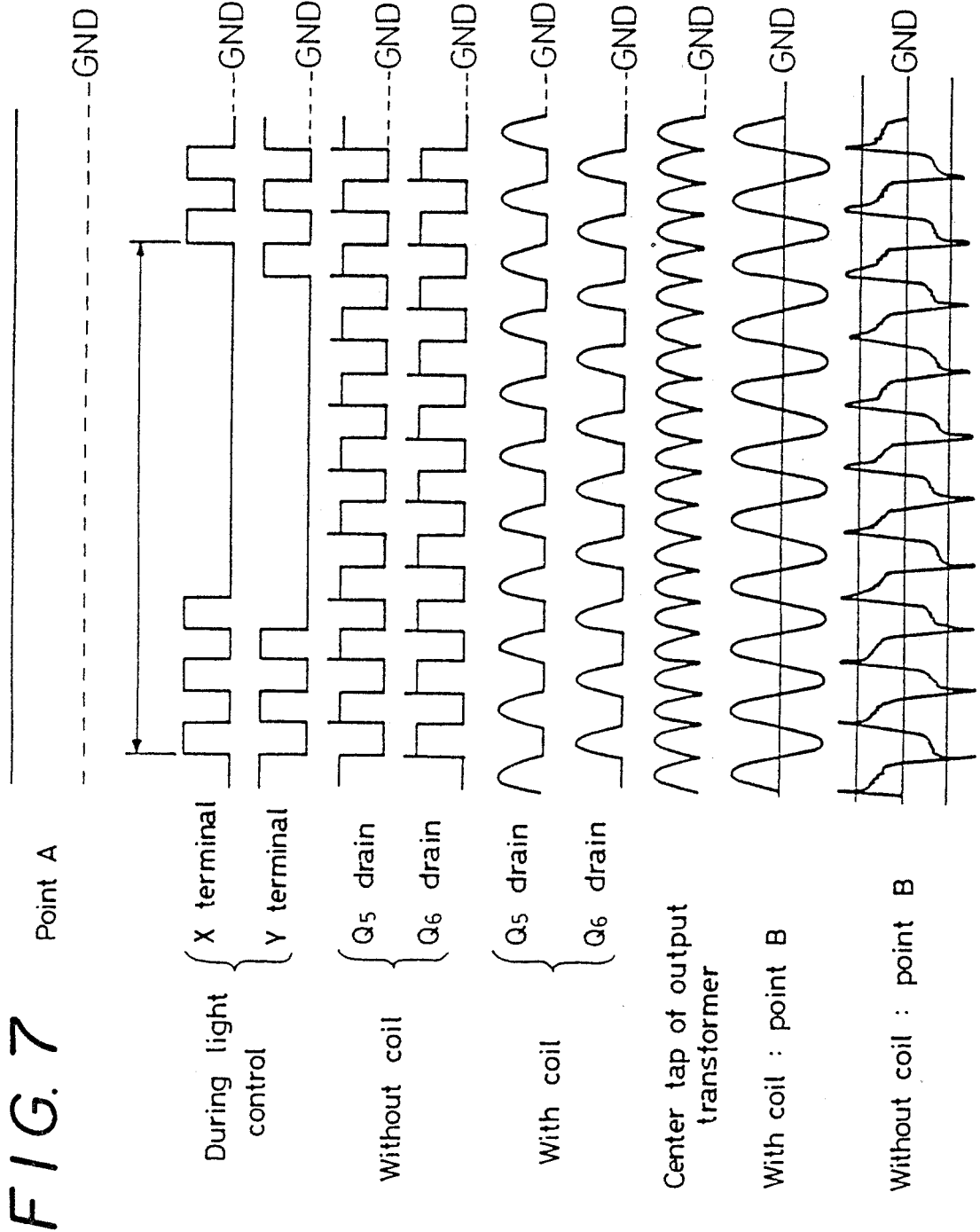
FIG. 7 shows signal waveforms at each part of FIG. 6.

Driving pulses, initially set in the CPU3 (see FIG. 2), enter in the output circuit 2 from terminals X and Y while also entering the gates of switching elements FETQ$_5$ and Q$_6$ via buffers 12 and 13 connected to the power supply ($V_{DD}$). Thus, a up-stepped voltage is generated in the secondary side of the output transformer T and supplied to the load of a discharge lamp 11. FIG. 7 shows signal waveforms at each part of FIG. 6.

If there is no coil L in the primary side of said output transformer T in the above, the power supply $V_{cc}$ is connected to the center tap of said transformer T. Therefore, voltage waveforms between each drain of FETQ, and $Q_6$, and the ground (GND) become as shown in FIG. 7. Also, waveforms between Point B and the ground in the secondary side of the output transformer T exceed a predetermined value when driving pulses build up or go down as shown in FIG. 7, like in the prior art. Therefore, an overvoltage is applied temporarily to the discharge lamp 11 while conducting a rush current resulting in shorter life of the lamp. With the present embodiment, however, a coil L is connected in the primary side of the output transformer T. Therefore, said rectangular waves are formed to sine wave in the primary side of said transformer T. In other words, with this coil L, voltage waveforms between the drain and the ground of said $FETQ_5$ and $Q_6$, at the center tap of the output transformer T and between Point B and the ground become sine waves as shown in FIG. 7.

Figure 8:
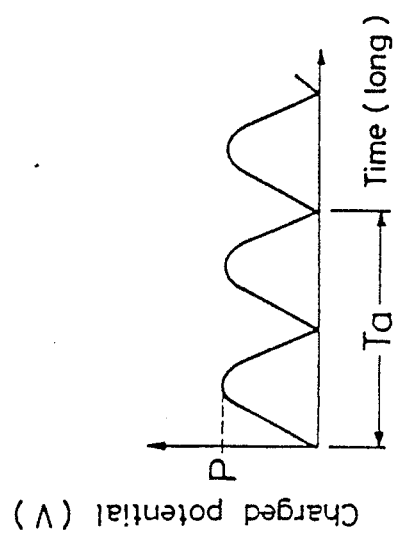
FIG. 8 is a circuit diagram for describing the operation of the circuit in FIG. 6.
Figure 9:
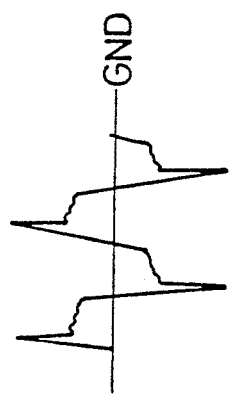
FIG. 9 shows operation waveforms of the circuit in FIG. 8.

Next, the operation of the circuit with said coil L will be detailed referring to the circuit diagram of FIG. 8 in the following. First, it is assumed that the primary and secondary sides of the output transformer T are completely matched with a capacity of C, in the primary side of the transformer. Symbols are defined as Z for the impedance of the discharge lamp load, $L_P$ for the inductance in the primary side of the transformer and LS for the inductance in the secondary side. Components of the inductance $L_P$ are separated into $L_{P1}$ for the side of the $FETQ_5$ and $L_{P2}$ for the $FETQ_6$ side. When a switch $SW_2$ ($FETQ_6$ in FIG. 6) is turned ON first, the potential at Point D of FIG. 8 becomes the ground level while forming a tank circuit comprising said inductance $L_P$ and capacitance $C_P$. Since the inductance $L_L$ of the coil L is significantly larger than $L_{P1}$ and $L_{P2}$ ($L_L>>L_{P1}$, $L_L>>L_{P2}$), the potential of Point E gradually increases as the $C_P$ is charged as shown in FIG. 9. When the potential reaches a voltage saturation point P, it gradually decreases. When the potential at point E becomes 0, switches $SW_1$ ($FETQ_5$ of FIG. 6) and $SW_2$ are reversed thereby turning switch $SW_1$ ON and switch $SW_2$ OFF. These switches $SW_1$ and $SW_2$ are repeatedly turned ON and OFF. Since a coil L is inserted between the center tap of the transformer T and the power supply, the potential of Point E becomes a sine wave as shown in FIG. 9. Defining one period of oscillation by $T_a$, the period of driving pulses entered from the CPU3 to the output circuit 2 is matched with period $T_a$.

Figure 10:
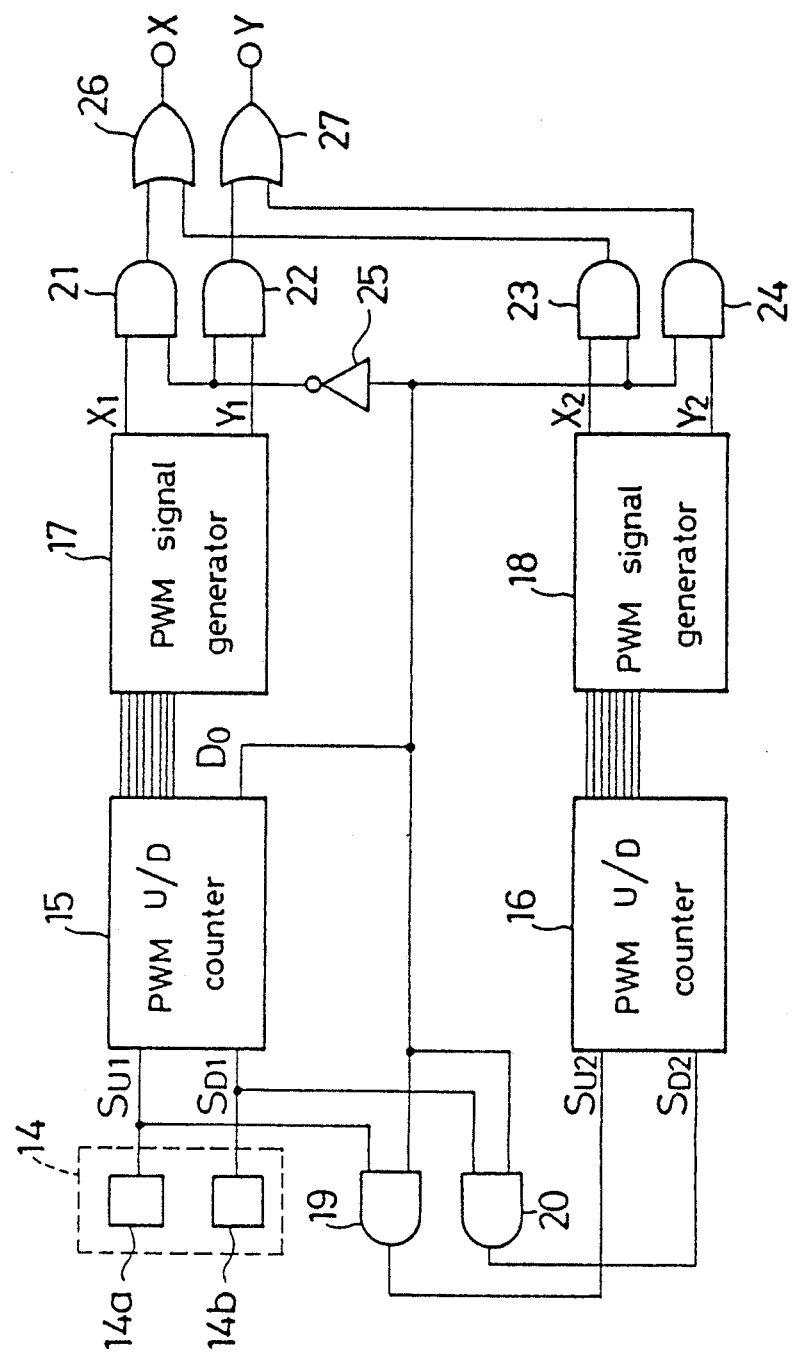
FIG. 10 is a circuit configuration view showing the 5th embodiment of the present invention.

FIG. 10 is a circuit diagram showing the 5th embodiment of the present invention; the configuration relates to a light control device for controlling the lighting of a load such as discharge lamp. This light control device constitutes the frequency control means as described above. In FIG. 10, numeral 14 is a light control switch comprising an up switch 14a and a down switch 14b; numerals 15 and 16 represent a first PWM (pulse width modulation) up/down (U/D) counter and a 2nd PWM U/D counter which count up and down, respectively, according to the switch 14; numerals 17 and 18 show a 1st PWM signal generator and a 2nd PWM signal generator which generate PWM signals based on the outputs of these U/D counters 15 and 16; numerals 19 through 24 represent AND gates while numerals 25, 26 and 27 denoting an inverter and OR gates, respectively.

Other details of the configuration are omitted here because they are the same as those in FIG. 6. When the power supply is normally turned ON with the light control circuit of the foregoing configuration, basic pulses are outputted from the first PWM generator 17 shown in FIG. 11 through OR gates 26 and 27. The basic pulses are entered from terminals X and Y of the output circuit, as driving pulses for switching elements (see FIG. 6). The basic pulses comprise the rectangular wave pulses of a period of $T_K$ with the same ON duration ($T_b$) equal to the OFF duration, i.e. 1:1. At this time, the output becomes maximum.

When the down switch 14b of the light control switch 14 is set so that the level of its down signal $S_{D1}$ becomes high (H) when the switch 14b is turned ON, and the first counter 15 is controlled to count down from an initial value (for example, hexadecimal FFH) by 1H each, these down-counted signals enter the first PWM signal generator 17. Thus, the generator 17 outputs such light control pulses $X_1$ and $Y_1$ as their oscillation is deactivated in a duration proportional to the counts by by $1T_b$ per count, periodically in predetermined periods of $T_D$ each, as shown in FIG. 11. Thereby, the load, e.g. a discharge lamp enters normally light-controlled ON state. The down signal $S_D$ is inputted from an input terminal of the AND gate 20. Since the other input terminal of the AND gate is in low (L) level, that is, the output signal $D_o$ of the first counter 15 is in the L level, the down signal $S_{D1}$ is not entered in the second counter 16 and the second PWM signal generator 18. When the down switch 14b is pressed continuously while the first counter 15 continuing down-counting and arriving at a preset value of, for instance, 03H, the level of the output signal $D_o$ of the first counter 15 changes from the L level to the H level. And, this signal $D_o$ in the H level is entered in the other input terminal of the AND gates 19, 20. Therefore, the output of the AND gate 20, i.e. the signal $S_{D2}$ in the H level, is entered in the second counter 16. At the same time, the output signal $D_o$ of the first counter, now in said H level, is entered in the invertor 25 which inverts the signal to the L level and inputs it into AND gates 21, 22. Consequently, outputting of light control pulses is deactivated. The output $D_o$ of the first counter 15, now in the H level, is inputted into AND gates 23, 24. Thus, the output pulses of the second PWM generator circuit 18 are outputted via the AND gates 23, 24 and the OR gates 26, 27.

It is now assumed that the initial value of the second counter 16 is also FFH, the same as that of the first counter. Then, when the ON period Tb is made shorter corresponding to $\Delta Tb$ ($\Delta Tb<<Tb$) per count (01H) and the counts of the second counter 16 reaches 03H, the light control pulses $X_2$, $Y_2$ with a shorter ON period of Tc (Tc<Tb) are obtained as shown in FIG. 11 High light control (Part 1). Even if the down signal $S_{D2}$ is entered in the second counter 16, the second counter 16 stops down-counting and maintains said preset value of 03H, while not continuing to count down any longer. In other words, the output becomes minimum at this instant.

Also, a present period of $T_D$ can be made longer up to Te by adjusting the Tf time longer corresponding to the ON period Tb or $\Delta Tb$ of said basic pulses ($\Delta Tb<<Tb$) as shown in FIG. 11 High light control (Part 2). At this time the time difference of (Te−Tf) is set and fixed at the same value of said High-light-control (Part 1) in FIG. 11.

Furthermore, it is also possible to activate the operations of said High-light controls (Part 1) and (Part 2) at the same time. More explicitly, the ON period Tb of the pulses is made shorter corresponding to ΔTb, and then the Tf time is extended by the same increment. These operations are repeated alternatively for generating a lowest output waveform. According to an experiment actually performed, it was possible to obtain Tb=16 μsec, TK=32 μsec, Tc=3 μsec, Td=8.2 msec, Te=12.5 msec and Tg=96 μsec.

The foregoing paragraphs have explained a case where the output is reduced from a maximum output. However, it is also operable to increase the output to a minimum output, by operating the up switch 14a shown in FIG. 10. At that time, the light control ratio can be increased up to a higher control ratio by using the pluralities of PWM U/P counters and PWM signal generators.

Next, the advantages of said double-PWM system are described additionally as follows. It is assumed for instance that there are 256 rectangular waves of Tk in a predetermined period of $T_D$. Then, the light control ratios in normal light-control operation alter, from the maximum output, in such a manner as 256/256→255/256→254/256—, with a light control ratio of 1/256. However, when the light controlling progresses further, the light control ratios alter in 3/256→2/256→1/256 with a change ratio of 1/2. In other words, the change ratio becomes larger at about a minimum output, despite a smaller change ratio around a maximum output. Consequently, the luminance of the load namely a discharge lamp suddenly decreases due to the large change at the minimum output. At that time, the observer will not be able to realize that the luminance changes linearly. In case that the luminance is to be controlled more finely at about the minimum output with a high light control ratio and a linear change ratio, the normal mode known in the prior art will not be capable always to satisfy a requirement. With the present embodiment, however, there are provided the second counter 16 and the second PWM signal generator 18 which can solve the foregoing problems.

When the luminance of a discharge lamp is controlled, the time of Tg shown in FIG. 11 is wasted to build up the discharge lamp and the invertor circuit. If this time Tg is made shorter than that shown in FIG. 11, failure of lighting-up or flickering may occur. However, according to this embodiment of the present invention, these problems are solved since the quantity of required energy can be reduced without varying the Tg time.

The present invention is applicable to a wide variety of uses, e.g. other types of switching regulators as well as CFL, WFL and EL lighting devices.

According to the present invention, as described above, a means for matching the frequency of oscillation signals entered from an external circuit with the resonant frequency of the output transformer has been provided. Therefore, the invention provides high-efficiency and optimum load control.

What is claimed is:

1. An inverter apparatus for converting a direct current into an alternating current, comprising:

an output transformer having a primary side coupled to a source of direct current and a secondary side coupled to a load, said secondary side and said load forming an output circuit, switching elements coupled to said primary side of said transformer for interrupting the flow of direct current through the primary side of said output transformer, frequency control means coupled to said switching elements for generating a signal for driving said switching elements at a frequency which causes said output circuit to oscillate at its resonant frequency, pulse width modulation means coupled to said frequency control means for controlling the pulse width of said signal generated by said frequency control means.

2. The inverter apparatus of claim 1, wherein the frequency of the signal generated by the frequency control means is controlled manually.

3. The inverter apparatus of claim 1, wherein the frequency control means further includes means for adjusting the frequency of the signal generated by the frequency control means such that an output voltage developed in said output circuit becomes a maximum.

4. The inverter apparatus of claim 1, wherein the frequency control means further includes means for adjusting the frequency of the signal generated by the frequency control means such that a direct current derived from the source of direct current becomes maximum.

5. The inverter apparatus of claim 1, wherein the pulse width modulation means includes an up/down counter coupled to said frequency control means for storing count data which determines the pulse width of the signal generated by the frequency control means, and switch means for setting the count stored within said up/down counter.

6. The inverter apparatus of claim 5, wherein said frequency control means includes two signal generators and said pulse width modulation means includes two up/down counters, said up/down counters respectively associated with said signal generators.

7. The inverter apparatus of claim 2, further including a coil having an inductance greater than the inductance of the primary side of the output transformer, said coil connected between said source of direct current and the primary side of the output transformer.

8. The inverter apparatus of claim 3, further including a coil having an inductance greater than the inductance of the primary side of the output transformer, said coil connected between said source of direct current and the primary side of the output transformer.

9. The inverter apparatus of claim 4, further including a coil having an inductance greater than the inductance of the primary side of the output transformer, said coil connected between said source of direct current and the primary side of the output transformer.

10. The inverter apparatus of claim 5, further including a coil having an inductance greater than the inductance of the primary side of the output transformer, said coil connected between said source of direct current and the primary side of the output transformer.

* * * * *

UNITED STATES PATENT AND TRADEMARK OFFICE
CERTIFICATE OF CORRECTION

PATENT NO. : 5,055,993

DATED : 10-8-91

INVENTOR(S) : Miyata, Kawano and Oki

It is certified that error appears in the above-identified patent and that said Letters Patent is hereby corrected as shown below:

In column 8, line 1, please delete "side" and add --winding--; in lines 1 and 2, please delete "coupled to a source of direct current"; in line 2, delete "side" and add --winding, said secondary winding--; in line 3, after first occurance of load, please add --and wherein--: in line 3, please delete "side" and add --winding--; and in line 4 delete "forming" and add --form--.

In column 8, between lines 4 and 5, please add --a coil coupled between said primary winding of said output transformer and a source of direct current, --.

In column 8, in line 5, please delete "side" and add --winding--; in line 6, please add --output-- between said and transformer; in line 7, please delete "side" and add --winding--.

In column 8, in line 44, please delete "further including" and add --wherein said--; in line 45, please delete "a" and delete "having" and add --has--; in line 46, please delete "side" and add --winding--: and in lines 46, 47 & 48, please delete", said coil connected between said source of direct current and the primary side of the output transformer".

In column 8, in line 51, please delete "side" and add --winding--: and in lines 51, 52 & 53, please delete", said coil connected between said source of direct current and the primary side of the output transformer".

In column 8, in line 56, please delete "side" and add --winding--; in lines 56, 57 & 58, please delete", said coil connected between said source of direct current and the primary side of the output transformer".

UNITED STATES PATENT AND TRADEMARK OFFICE
CERTIFICATE OF CORRECTION

PATENT NO. : 5,055,993
DATED : 10-8-91
INVENTOR(S) : Miyata, Kawano and Oki

It is certified that error appears in the above-identified patent and that said Letters Patent is hereby corrected as shown below:

In column 8, in line 61, please delete "side" and add --winding--; and in lines 61, 62 & 63, please delete", said coil connected between said source of direct current and the primary side of the output transformer".

Signed and Sealed this

Eighteenth Day of May, 1993

Attest:

MICHAEL K. KIRK

Attesting Officer

Acting Commissioner of Patents and Trademarks